(12) United States Patent
Haines et al.

(10) Patent No.: US 9,471,221 B2
(45) Date of Patent: Oct. 18, 2016

(54) GENERALIZED POSITIONAL ORDERING

(75) Inventors: Jonathan W. Haines, Boulder, CO (US); Timothy R. Feldman, Louisville, CO (US); Wayne H. Vinson, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 932 days.

(21) Appl. No.: 13/081,251

(22) Filed: Apr. 6, 2011
(Under 37 CFR 1.47)

(65) Prior Publication Data
US 2012/0260047 A1   Oct. 11, 2012

(51) Int. Cl.
*G06F 3/00* (2006.01)
*G06F 3/06* (2006.01)
*G06F 13/16* (2006.01)

(52) U.S. Cl.
CPC .............. *G06F 3/06* (2013.01); *G06F 3/0613* (2013.01); *G06F 3/0659* (2013.01); *G06F 3/0676* (2013.01); *G06F 13/16* (2013.01)

(58) Field of Classification Search
None
See application file for complete search history.

(56) References Cited

U.S. PATENT DOCUMENTS

| 5,771,131 | A  | * | 6/1998 | Pirzadeh ..................... 360/77.08 |
| 7,114,029 | B1 | * | 9/2006 | Thelin ............................ 711/112 |
| 7,509,443 | B2 | * | 3/2009 | Matsuo .................... G06F 3/061 710/1 |
| 8,719,520 | B1 | * | 5/2014 | Piszczek ............. G06F 11/1076 709/219 |
| 2003/0056034 | A1 | * | 3/2003 | Olds et al. ....................... 710/5 |
| 2003/0188092 | A1 | * | 10/2003 | Heath .................... G06F 3/0601 711/111 |
| 2004/0015653 | A1 | * | 1/2004 | Trantham .............. G06F 3/0611 711/113 |

* cited by examiner

*Primary Examiner* — Henry Tsai
*Assistant Examiner* — Aurangzeb Hassan
(74) *Attorney, Agent, or Firm* — HolzerIPLaw, PC

(57) ABSTRACT

Implementations described and claimed herein provide a method and system for managing execution of commands for a storage device, the method comprising determining a plurality of commands to be executed for the storage device and while a storage device is executing at least one command, determining an execution order for at least two of the plurality of commands. Alternate implementation described and claimed herein provide a computer readable memory for storing a data structure, the data structure comprising a cost table comprising a number of cells, each cell containing one or more cost values related to one of a plurality of traversals between two locations on a storage device wherein each of the plurality of traversals is related to completion of one of a plurality of commands and a benefit array comprising a number of cells, each cell containing a benefit value related to completion of one of the plurality of commands.

20 Claims, 9 Drawing Sheets

GENERALIZED POSITIONAL ORDERING

SUMMARY

Implementations described and claimed herein provide a method and system for managing execution of commands for a storage device, the method comprising determining a plurality of commands to be executed for the storage device and while a storage device is executing at least one command, determining an execution order for at least two of the plurality of commands. Alternate implementation described and claimed herein provide a computer readable memory for storing a data structure, the data structure comprising a cost table comprising a number of cells, each cell containing one or more cost values related to one of a plurality of traversals between two locations on a storage device wherein each of the plurality of traversals is related to completion of one of a plurality of commands and a benefit array comprising a number of cells, each cell containing a benefit value related to completion of one of the plurality of commands. These and various other features and advantages will be apparent from a reading of the following detailed descriptions. Other implementations are also described and recited herein.

BRIEF DESCRIPTIONS OF THE DRAWINGS

DETAILED DESCRIPTIONS

Figure 1:
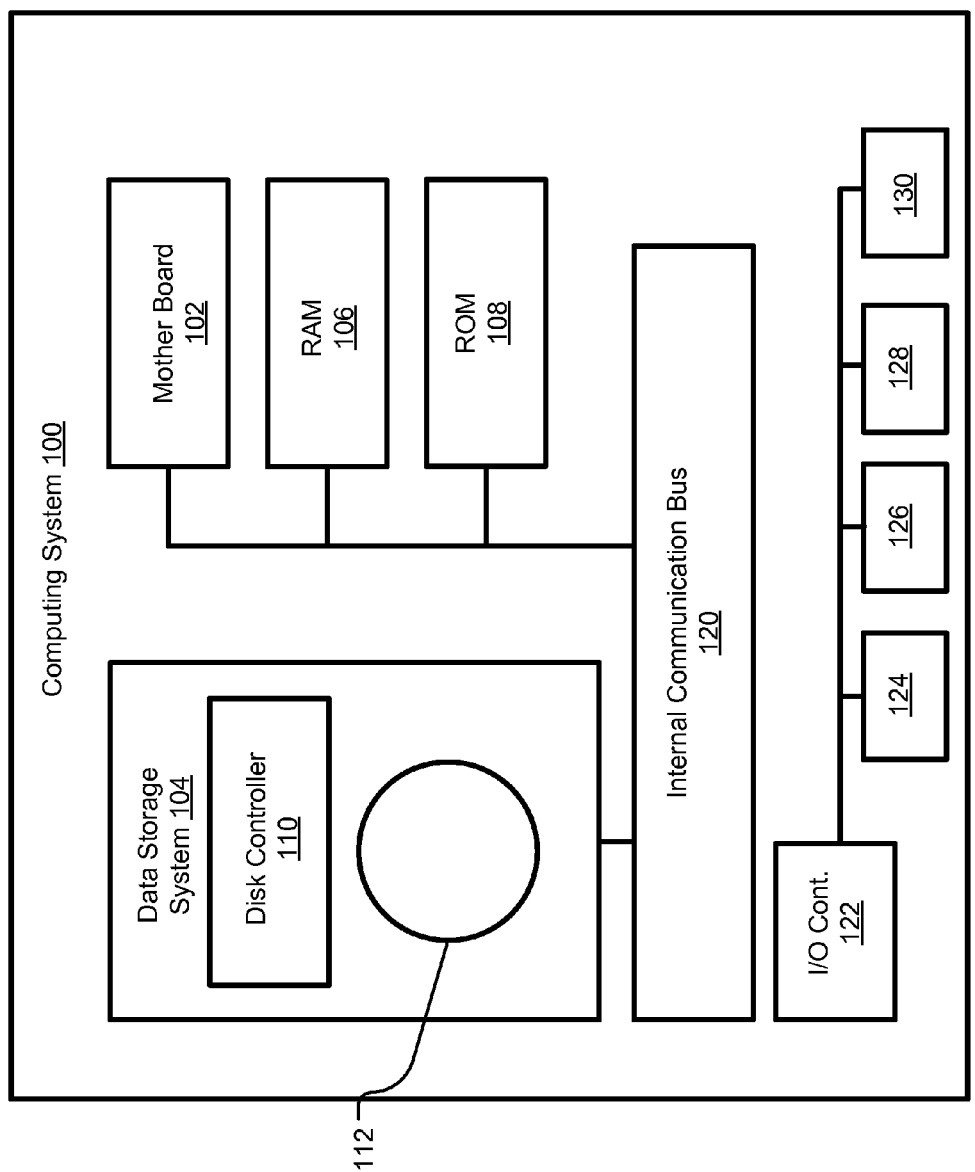
FIG. 1 illustrates an example computer system according to an embodiment disclosed herein.

FIG. 1 illustrates an example computing system 100 such as a server, a desktop, a laptop, a media device, a personal data assistant, etc. The computing system 100 may include a motherboard 102, a data storage system (DSS) 104, a random access memory (RAM) 106, a read only memory (ROM) 106. The DSS 104 includes a disk controller 110, a disk drive 112 and a number of other components. The computing system 100 may also include an internal communication bus 120 communicatively connected to one or more internal devices and to a number of external communication and input/output devices. For example, an input/output controller 122 may be used to connect a wireless communication terminal 124, a keyboard connector 126, and a mouse connector 128 to the internal communication bus 120. Various components of the computing system 100 may be powered by a power supply 130. In an embodiment of the computing system 100, the DSS 104 may employ a method of reordering read and write commands for a disk drive, the method comprising, reordering the commands using an iteratively deepening depth first search. Such reordering of read and write commands is described in further detail below.

Figure 2:
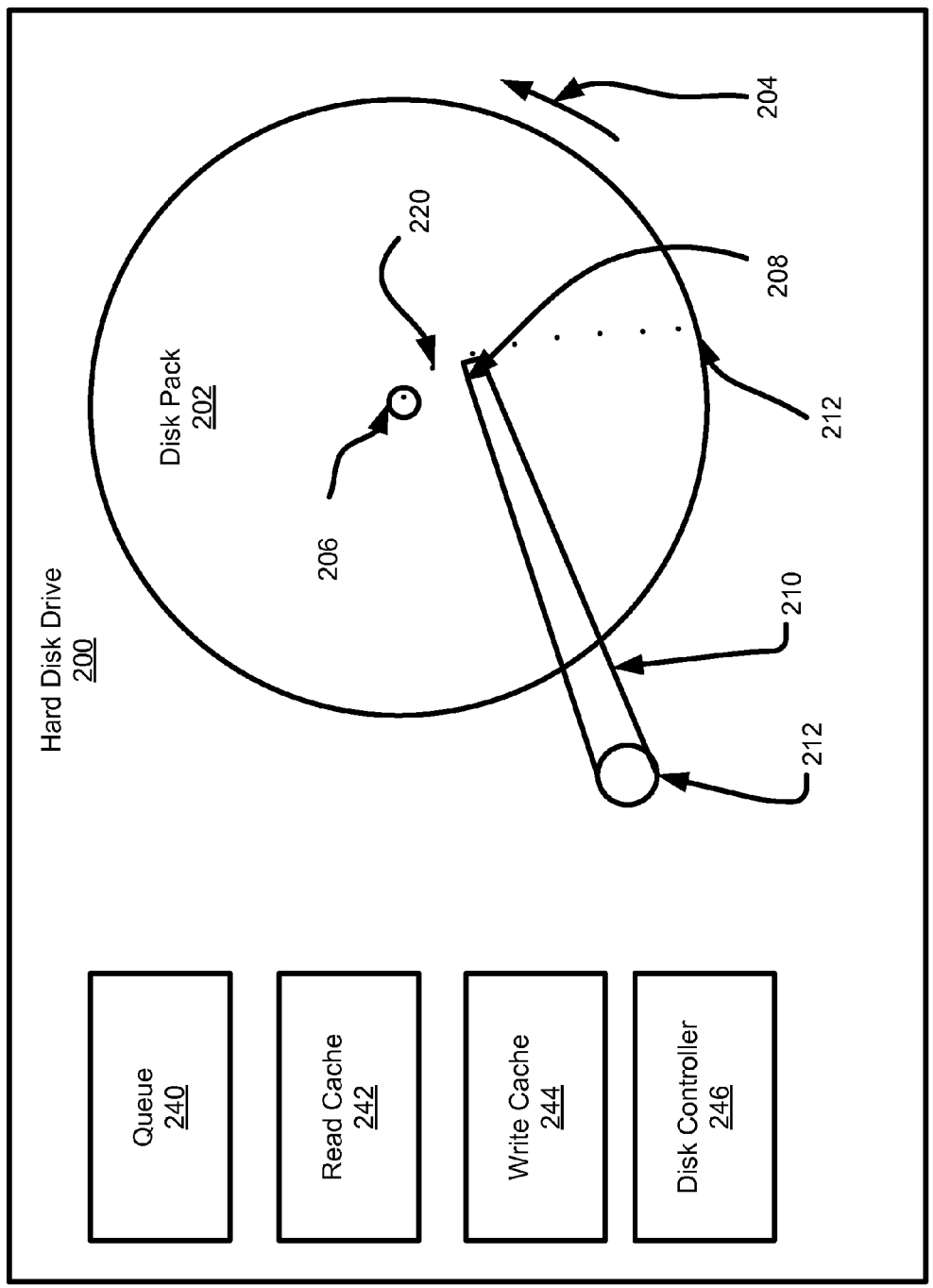
FIG. 2 illustrates an example disk drive according to an embodiment disclosed herein.

FIG. 2 illustrates an example block diagram of a hard disk drive (HDD) 200. The HDD 200 may include a disk pack 202, which is mounted on spindle motor (not shown). The disk pack 202 includes one or more individual disks, which rotate in a direction indicated by the arrow 204 about a central axis 206. Each surface on each disk of the disk pack 202 may be divided into a number of circumferential tracks, with each track being further divided into a number of sectors.

Each surface of each disk has an associated disk read/write head 208 for communication with the disk surface. The head 208 is attached to one end of an actuator arm 210 that rotates about a pivot point 212 to position the head 208 over a desired data track on a surface within the disk pack 202. Specifically, the actuator arm 210 may rotate around the pivot 212 so that the head 208 may be able to read data from or write data to a surface in the disk pack 202 along an arc 220, wherein the arc 220 may span from close to the central axis 206 to close to the edge 222 of the disk.

The DSS 104, such as the HDD 200, may receive multiple commands to write data to or read data from the computing system 100. When the HDD 200 receives these commands at a rate faster than the rate the commands can be executed, the commands are buffered to await their turn for processing by a microprocessor in the data storage device 104. The HDD 200 may store the incoming commands in a queue 240 and assign a queue tag to each command waiting to be processed. The queue tag is generally identical to the queue tag used by the host for queued host commands. Because often such queues, such as the queue 240, are limited in size, data storage devices can generally store only a finite number of commands. Quite often, the performance of a data processing device is measured in terms of the number of commands processed in given time. Moreover, the order in which the received commands are processed affects the performance of the storage device. Reordering the commands may allow for more efficient performance of the drive hardware.

Therefore, data storage devices, such as the HDD 200, have an incentive to process the commands as fast as possible. The HDD 200 may also include a read cache 242 for storing data read from the disk pack 202 in response to read commands. A write cache 244 may be used to store data to be written to the disk pack 202. The read cache 242 and the write cache 244 may be generally implemented by registers, by random access memory, or by using other memory structure. In one implementation of the system disclosed herein, the completion of read and write commands is reordered to maximize cache utilization, or in combination with one or more other performance measurement such as read throughput, write throughput, etc.

To manage the operation of the HDD 200, a disk controller 246 may process various commands in the queue 240 in a predetermined manner. When determining how to process the commands the disk controller 246 may consider a number of different methods. In an embodiment of the HDD 200, the disk controller 246 may employ a method of reordering commands for a disk drive, the method comprising, reordering the commands using an iteratively deepening depth first search. Such reordering of commands is described in further detail below.

For completing an individual command for a given set of sectors, the disk controller may have to affect a partial to more than one circumferential rotation of a disk around the axis 206. Moreover, the disk controller 246 may also have to position the head 208 at an appropriate radial position along the arc 220 (referred to herein as a stroke).

For example, to execute a command the head 208 has to seek to a particular track on a particular surface. Moreover, on a given track, the data has to be written to or read from a particular sector, therefore, the completion of a command also cannot begin until the head 208 has reached the beginning of such a sector. Thus, the latency time, which is the time before a next read or write operation can start based on the current position of the head 208 includes the seek to track time and the rotate to starting position time. For example, if for a given disk the time for rotation of the disk is 10 ms and the time for a complete stroke of the head around the arc 220 is 45 ms, the average latency time for a write operation may be approximately 20 ms, as given by the sum of one third of the stroke time (15 ms) and one half of the rotation time (5 ms).

In determining the execution of commands, the disk controller 246 may order the execution of one or more commands from the queue 240 such that one or more parameters, such as the average seek time, total seek time, etc., is optimized. An example of such optimization is illustrated in FIG. 3.

Figure 3:
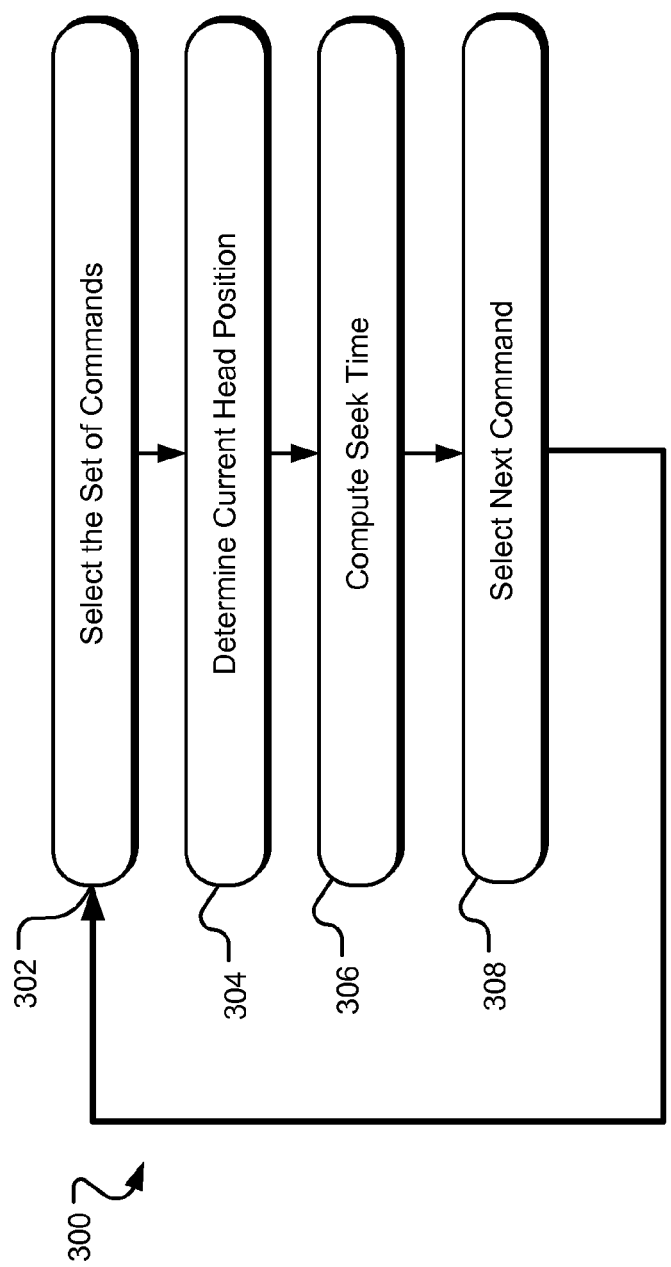
FIG. 3 illustrates a flowchart of a depth one search implemented by the hard disk drive of FIG. 2.

Specifically, FIG. 3 illustrates a flowchart 300 of a depth one best seek time search. In optimizing commands using a depth one search, at a block 302, the disk controller 246 may determine the existing commands in the queue 240. As the queue 240 is generally changing dynamically based on the commands received from the computing system 100 and completion of commands execution, the disk controller 246 may use a predetermined rule in deciding when or how often to take a snapshot of the existing commands in the queue 240. Alternatively, the disk controller 246 may undertake the reordering only when a pre-determined number of commands are available in the queue 240. Such a rule based on the number of available commands may be beneficial given that generally, the larger is the group of available commands, the better are the benefits achieved by performing the optimization.

Subsequently, at a block 304, the disk controller 246 determines the current position of the head. Note that while in the flowchart 300 the steps 302 and 304 are illustrated as distinct steps, in practice these two steps may be executed simultaneously. At block 306, the disk controller computes the seek latency of each command selected at block 302. Thus, depending on the starting position of each command and the current position of the head 208, the latency time of each command is determined.

At block 308, the disk controller 246 selects the next command. Such selection may be made, for example, by selecting a command having the lowest latency. Subsequently, the disk controller selects a new set of commands at block 302 and determines the current set of existing commands.

Note that a number of variations of the one depth search described above in FIG. 3 are possible. In an alternate embodiment, the disk controller 246 may wait until a seek operation is undertaken to move to another disk location before it determines the "next command after that one" that will result in the minimum seek time. As a result, this searching occurs while the disk controller 246 needs more of the computational bandwidth of a microprocessor than normal (because it is seeking). Further, the amount of time available for computation before the head 208 moves is limited, and once the head 208 moves, the existing computation of latency time may become invalid. The disk controller 246 may undertake such computation of latency times and ordering of the commands when the while other activities are occurring within the hard disk drive 200 and the disk controller 246 is not under heavy use.

An example of the benefits of using a search of deeper than one is illustrated based on the queue containing, for example, a set of commands A-D at a given point in time, with the position of the head 208 at the "start" location. The following table 1 illustrates the locations of the commands A-D in terms of the angular position (θ) on the disk where the position of the head 208 needs to be to perform the particular command. Thus, for example, to perform the operation A, the head 208 needs to be at angular position represented by 0.3 rotation, for operation B, the head 208 needs to be at angular position represented by 0.4 rotation, etc.

TABLE 1

| | Angular Position (θ) | | | | | | | | | | Buffers |
|---|---|---|---|---|---|---|---|---|---|---|---|
| | 0 | 0.1 | 0.2 | 0.3 | 0.4 | 0.5 | 0.6 | 0.7 | 0.8 | 0.9 | Freed |
| Command A | | | | A | | | | | | | 5 |
| B | | | | | | B | | | | | 2 |
| C | | | | | C | | | | | | 15 |
| D | | | | | | | D | | | | 8 |

Specifically, Table 1 illustrates that to go from the starting position of the head 208 (as denoted by "Start") to command A will take 0.3 revolution of the disk drive, to go from the Start (which is at the angular position zero) to location B will take 0.4 revolution, etc. Note that in the illustrated implementation the commands A-D in Table 1 are achievable without an extra revolution of the disk drive. However, sometime given the track position of a command compared to the current position of the head 208, it may be necessary for more than one revolution to go from the Start to a given command.

Table 1 also provides a listing of the amount of buffer space that will be freed by executing each of the commands A-D. Thus, for example, if command A was a write command, when command A is executed, five units of buffer space from the write cache 244 will be freed. Similarly, if command B was also a write command, when command B is executed, two units of buffer space from the write cache 244 will be freed.

Table 2 below provides an alternate illustration of the latency times provided above in Table 1. Specifically, Table 2 provides the latency times not only between the starting position of the head 208 and a starting position of a given command, but it also gives the latency times between each combination of commands, such as the time between A and D, B and C, etc. Furthermore, Table 2 also provides other costs $x_{i,j}$ and $y_{i,j}$ related to each of the commands. Table 2 may also be referred to as a rotational positional ordering (RPO) table.

TABLE 2

| | | From | | | | |
|---|---|---|---|---|---|---|
| | | Start | A | B | C | D |
| To | Start | * | (0.3, $x_{S-A}$, $y_{S-A}$) | (0.4, $x_{S-B}$, $y_{S-B}$) | (0.4, $x_{S-C}$, $y_{S-C}$) | (0.5, $x_{S-D}$, $y_{S-D}$) |
| | A | * | * | (0.1, $x_{A-B}$, $y_{A-B}$) | (1.1, $x_{A-C}$, $y_{A-C}$) | (1.2, $x_{A-D}$, $y_{A-D}$) |
| | B | * | (0.9, $x_{B-A}$, $y_{B-A}$) | * | (1, $x_{B-C}$, $y_{B-C}$) | (1.2, $x_{B-D}$, $y_{B-D}$) |
| | C | * | (0.9, $x_{C-A}$, $y_{C-A}$) | (1, $x_{C-B}$, $y_{C-B}$) | * | (0.1, $x_{C-D}$, $y_{C-D}$) |

TABLE 2-continued

| | From | | | | |
|---|---|---|---|---|---|
| | Start | A | B | C | D |
| D | * | (0.8, $x_{D-A}$, $y_{D-A}$) | (0.9, $x_{D-B}$, $y_{D-B}$) | (0.9, $x_{D-C}$, $y_{D-C}$) | * |

Table 3 below illustrates an array that provides a benefit related to each of the commands A-D. Specifically, Table 3 provides the buffer resource freed per each of the commands A-D. Furthermore, Table 3 also provides other benefits $z_i$ related to each of the commands.

TABLE 3

| | | Buffers Freed, etc. |
|---|---|---|
| Command | A | (5, $z_A$) |
| | B | (2, $z_B$) |
| | C | (15, $z_C$) |
| | D | (8, $z_D$) |

Given the latency time and the buffer resource information as per Tables 2 and 3, a simple depth one search that focuses only on latency time would have selected "Start-A-B" as the sequence of commands to be executed. This is because, when the head 208 is at the start position, the command A is the closest one, and when the head 208 is at a position given by completion of command A, command B is the closest one. Notice that the latency time from command A to command C is 1.1 even though they are on adjacent sectors. This may be due to the track position of commands A and C may be such that the there is not enough time for the head 208 to move from the track of command A to the track of command C by the time the disk spins 0.1 revolution. As such, the disk will have to complete a full revolution before the head 208 has moved to the track of command C.

In selecting the sequence of "Start-A-B," the buffer resources freed by completion of a particular command are not taken into consideration. However, if the buffer resources are taken into consideration, "Start-C-D" sequence will be selected, as more buffer resources would have been freed by such a sequence. Even though, the sequence "Start-C-D" may take slightly more time to complete. Yet alternatively, a weight may be assigned to each of the latency time and the buffer resources freed to determine a sequence that gives the most optimized result.

Furthermore, a depth one search may not always give the optimal results if a total time for executing the commands, or the average time in executing the commands, etc., is selected as the optimized parameter. To get an optimized result in such as case, a search to a higher depth may be considered. However, when a large number of commands are to be analyzed a search to a level deeper than depth one may be time consuming and the disk controller 246 may not have the processor time available to do such an extensive search. For example, if there were five commands and an exhaustive search to depth of five was to be undertaken to determine the optimal route, each of 5! (5*4*3*2*1=120) potential routes will have to be evaluated. Such an analysis may become quite cumbersome as more commands are added to the queue and are considered in any optimization routine.

Figure 4:
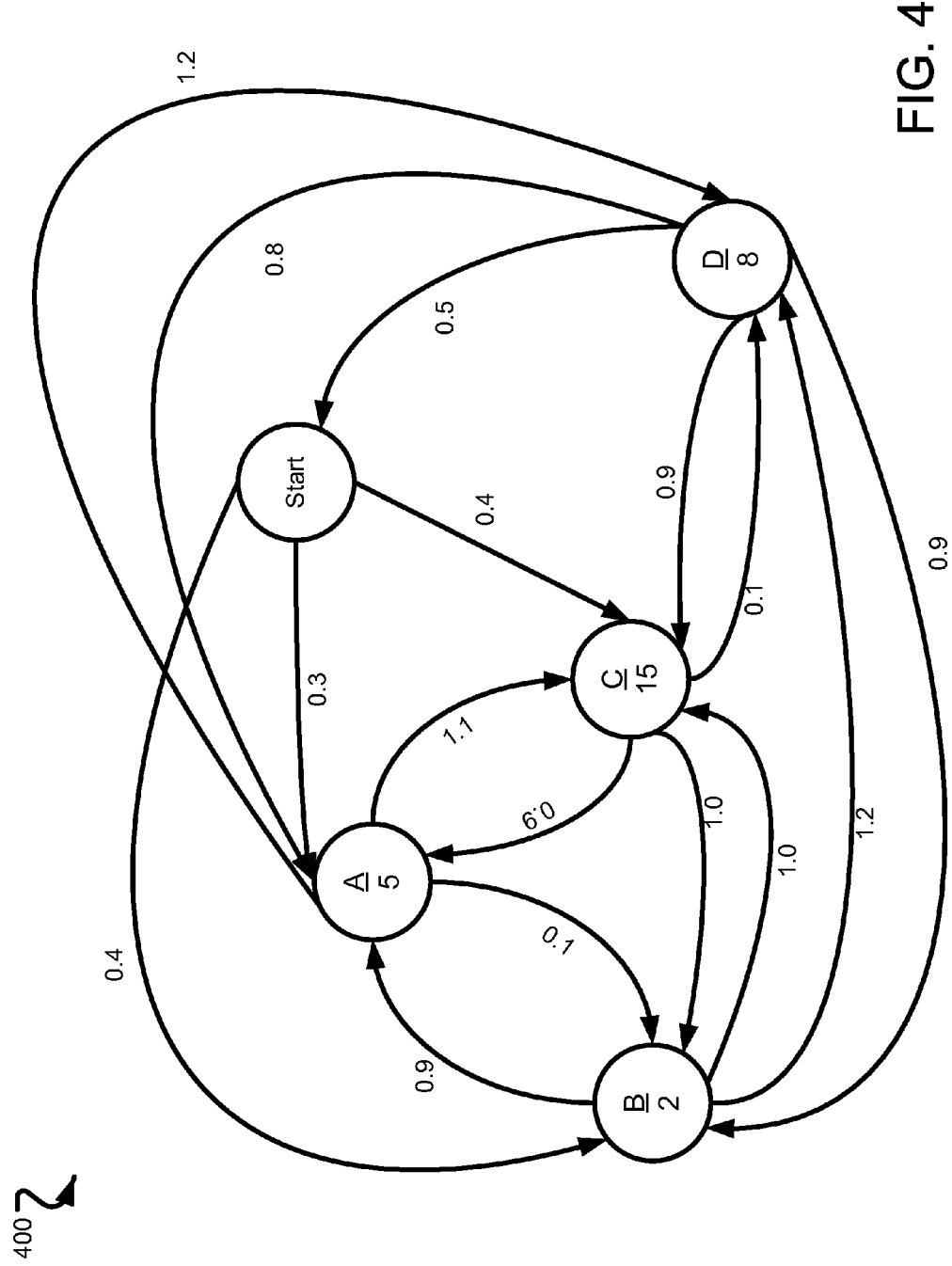
FIG. 4 illustrates an example graph using the costs and benefits related to various commands.

Alternatively, the commands listed in Table 2 may be illustrated by a graph. FIG. 4 illustrates an example graph 400 using costs and benefits related to various commands. Specifically, the graph 400 includes the seek and execute time to next command as the cost and the buffer space freed per commands as the benefit related to various commands. For simplicity, graph 400 depicts only the first three commands A-C. In graph 400, each of the nodes A-C represents a command and the buffer space to be freed by execution of such a command. The edges of the graph (the connectors between the nodes) illustrate the seek and execute time to go from the start position to a given command, or the seek and execute time to go from a given command to the next command.

The graph 400 may also be referred to as a directed graph as the values related to at least some of the edges depend on the direction of the edge. For example, the value of edge A-B is 0.1 whereas the value of the edge B-A is 0.9. While in graph 400, the weights attached to the nodes are the buffer space freed, a number of other parameters, such as a cost or a benefit related to a command may be attached to the nodes. Thus, for example, node A may have a parameter related to SRAM descriptors freed by executing command A attached to its node. Alternatively, the amount of firmware contributed by completing a operation may also be attached to the nodes A-C. Generally, parameters assigned to the nodes represent some type of benefit attained by performing a particular command, however, in some embodiments, a cost may also be assigned to a node.

In a similar fashion, while the edges between the nodes represent the time for the movement of the head 208 from one command to another, other parameters related to such operation may also be denoted. Thus, for example, in an embodiment, the edges may denote the energy used in moving the head 208 from one command to another, the noise generated in moving the head 208 from one command to another, etc. Generally, parameters assigned to the edges represent some type of cost in performing a particular command, however, in some embodiments, a benefit may also be assigned to an edge.

Figure 5A:
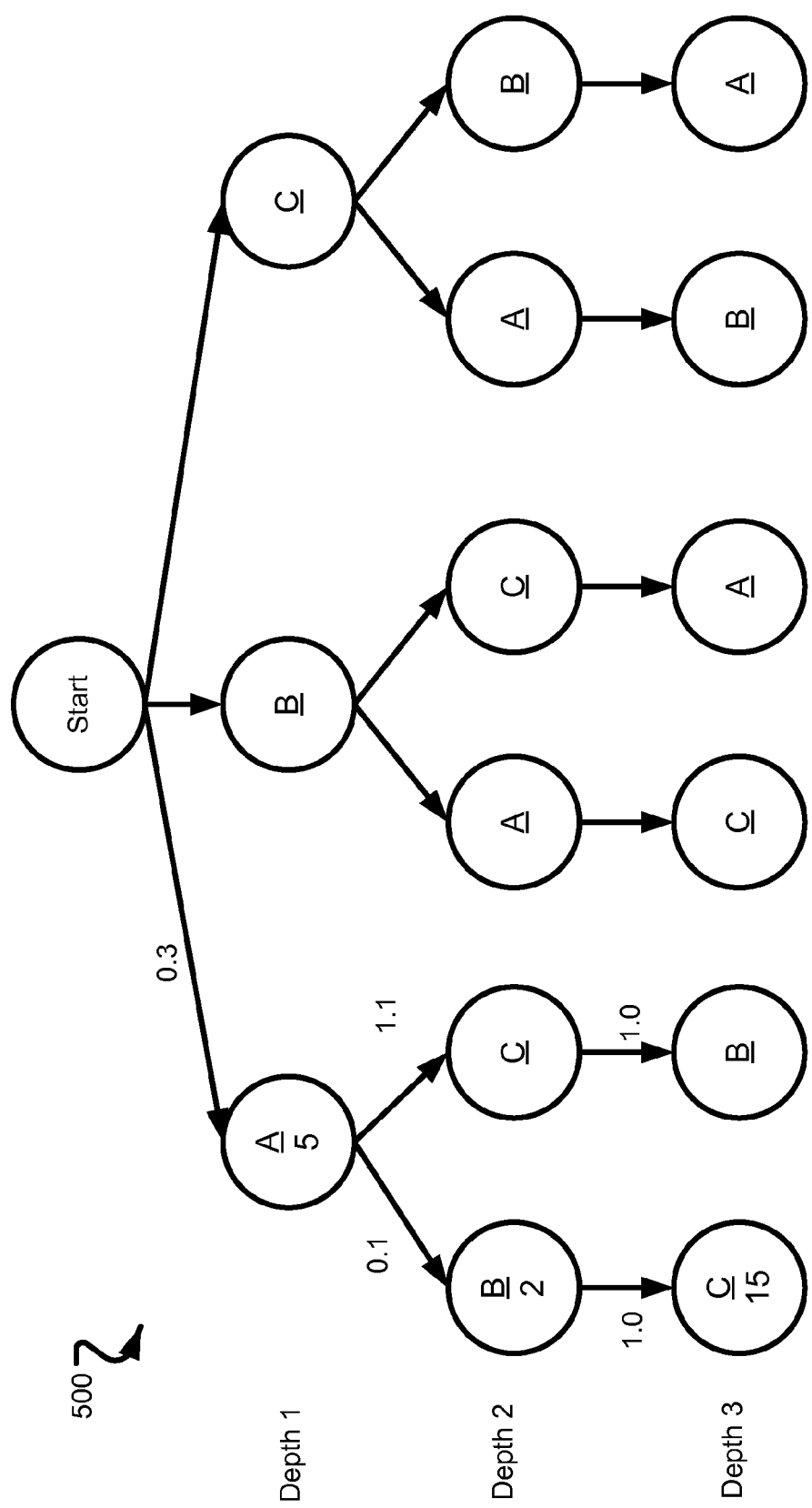
FIGS. 5A and 5B illustrate command-ordering optimization trees generated based on the graph of FIG. 4.

Based on the graph 400 or the table 2, a command-ordering optimization tree of a desired depth may be generated. FIG. 5A illustrates a command-ordering optimization tree 500 for performing commands in various orders assuming if there were only three commands A, B, and C. Thus, the optimization tree 500 of FIG. 5A is complete optimization tree, i.e., it considers all the potential paths for commands. While the command-ordering optimization tree 500 as depicted in FIG. 5A does not show the costs and benefits attached to all the paths, one particular path, Start-A-B-C, is illustrated to have the buffer space freed as the benefit attached to its nodes and the time to move to the particular command as the cost attached to various edges. Thus by completing this path, total 22 units of buffer space will be freed while the total time would be 1.4 units. Note that because the paths are shown as complete paths, the total buffer space freed would be the same. However, the same is not true for the total time. For example, the path "Start-A-C-B" would cost 2.4 units of time compared to 1.4 units for the "Start-A-B-C path."

As the number of nodes in the command-ordering optimization tree 500 increases, the command-ordering optimization tree 500 becomes substantially large, as such, it may not be possible for a microprocessor on a storage device, such as a microprocessor on the disk controller 246 to calculate the costs and benefits attached to each of the various paths. For example, if all of the four commands were used in calculating the optimization tree, there would be potentially 24 different paths for order execution (the number of paths is equal to the factorial of the number of commands, thus in this case the potential number of paths equals 4!=24).

Figure 5B:
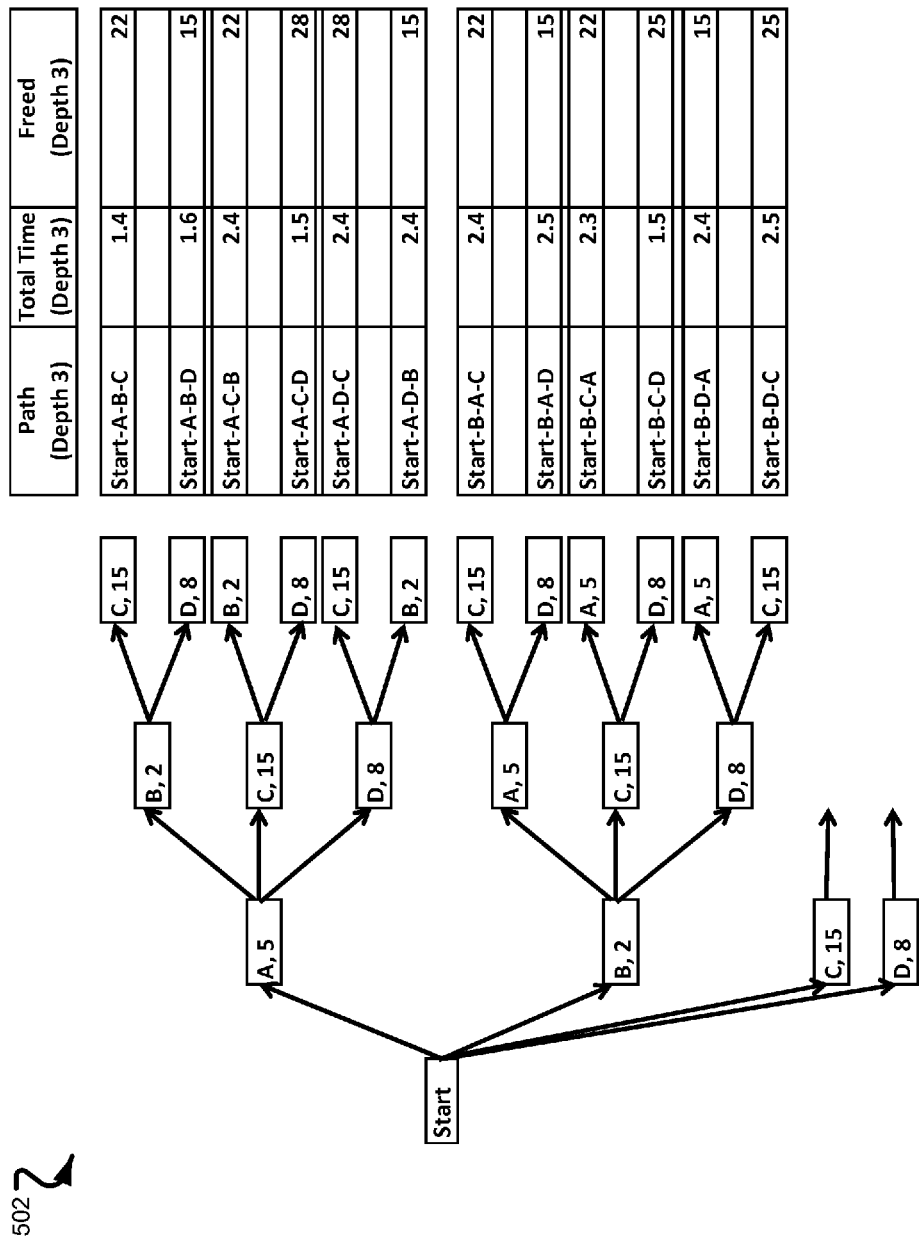

FIG. 5B shows a partial optimization tree 502 that illustrates some of such 24 potential paths. Specifically, the optimization tree shows twelve potential paths (Start-A-B-C . . . Start-B-D-C) and the related total latency times and total buffer space freed for a depth of up to three commands deep. In this illustration paths related to the selection of commands A and B as the first command are calculated without any calculations related to the selection of commands C and D as the first command. Such depiction is for illustration purpose only, In an alternate illustration, each path to the depth of level two may be calculated first before any calculations to the level of depth three is performed.

In an embodiment, when the HDD 200 is performing a first operation, the disk controller 246 may use commands A-B in queue 240 to calculate the total cost and total benefits related to one or more of the paths as illustrated in FIG. 5B. In a particular case, the disk controller 246 may not be able to complete all the calculations related to the complete optimization tree 500 or the partial optimization tree 502. Thus, the depth to which the optimization tree is searched is determined dynamically based on the amount of time and resources available to the disk controller 246. For example, in one embodiment, when the disk controller 246 runs out of processor time, it may stop searching the optimization tree to any additional depth. In an alternate embodiment, when the disk controller 246 runs out of available resources, such as registers, etc., it may decide to stop searching the optimization tree to any additional depth.

In such a case, based on the current available information about total costs and total benefits related to various paths to the depth searched, the disk controller 246 may decide the order of execution for the commands A-D. While the optimization tree 502 discloses the values calculated for only one cost (latency time) and only one benefit (buffers freed), in an alternate embodiment a number of different costs and a number of different benefits related to each path may be calculated. For example, costs related to energy expanded per each path, the costs related to noise generated per each path, etc., may also be calculated. The selection of the order of execution for the commands may also be based on some weighted formula that assigns different weights to different costs and benefits. For example, in one embodiment, the weight assigned to the cost of latency time may be higher than the weight assigned to the cost of energy expanded.

However, as a compromise, the disk controller may employ an iteratively deepening depth first search (IDDFS) algorithm. In employing the IDDFS algorithm, the disk controller calculates such costs and benefits related to various paths iteratively. In employing such a routine, the disk controller 246 dynamically calculates the cost and benefit values to a given level depending upon the amount of time available. Thus, for example, at a given point if the disk controller 246 has any idle time, it performs calculations as necessary for a depth one and determines a best path among the various depth one paths. At this point, if there is more time available, the disk controller 246 starts making calculations for various depth 2 searches. Note that once the cost attached to each alternate routes at depth one are determined, the value of such costs can be used repeatedly at the following depths.

The disk controller 246 may dynamically determine what depth level to perform such searched based on a number of parameters. In one embodiment, the decision to stop making further searches to increasing depth may be based on available microprocessor time. In an alternate embodiment, the decision to stop making further searches may be based on certain threshold, wherein such as threshold may be defined in the terms of the cost and/or the benefit related to the best path found by the present searches. Yet alternatively, the decision to stop making further searches may be based on the available register space for performing such calculations. In an embodiment, the IDDFS may be implemented using an application specific integrated circuit (ASIC), a special hardware engine, etc. Other methods of performing search along the optimization trees 500, 502, such as a fixed depth depth-first search, etc., may also be employed. For example, in a fixed depth depth-first search, each path is calculated up to a fixed depth before making calculation for the alternate paths. Yet alternatively, other type of search method, based on heuristic observation of past search results, may also be employed.

Once a decision is made to complete doing calculation for more depth searches, the disk controller 246 may decide to commit to only the first, or the most immediate step, based on the searches. In such a case, the disk controller will restart calculations for the next step while the immediate step, to which it has committed, is being performed. In such a case, the disk controller may recalculate the command-ordering optimization tree 500 based on the current starting position and initiate a new depth one search.

Figure 6A:
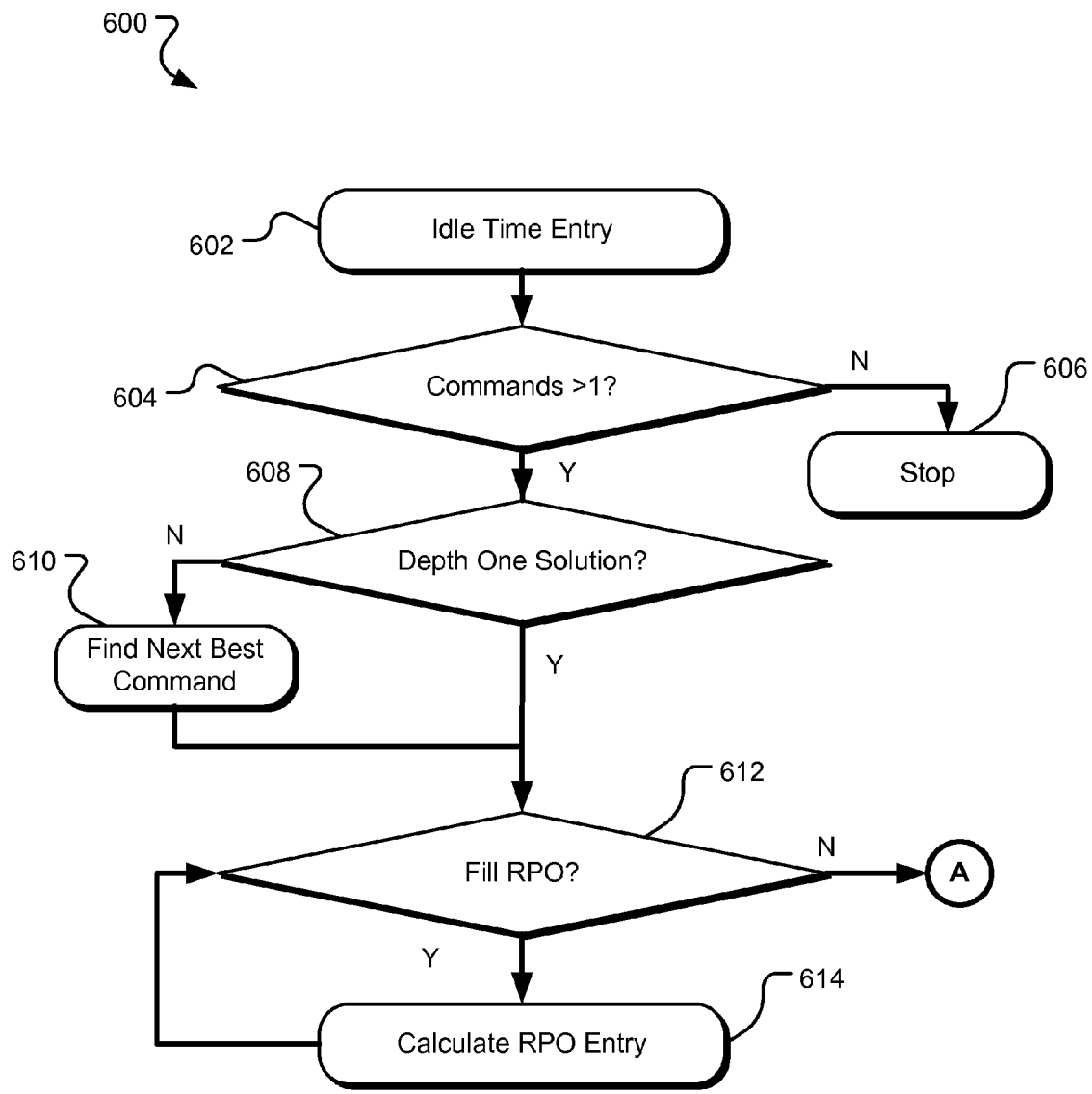
FIGS. 6A and 6B illustrate a flowchart of iterative depth search implemented by the hard disk drive of FIG. 2.
Figure 6B:
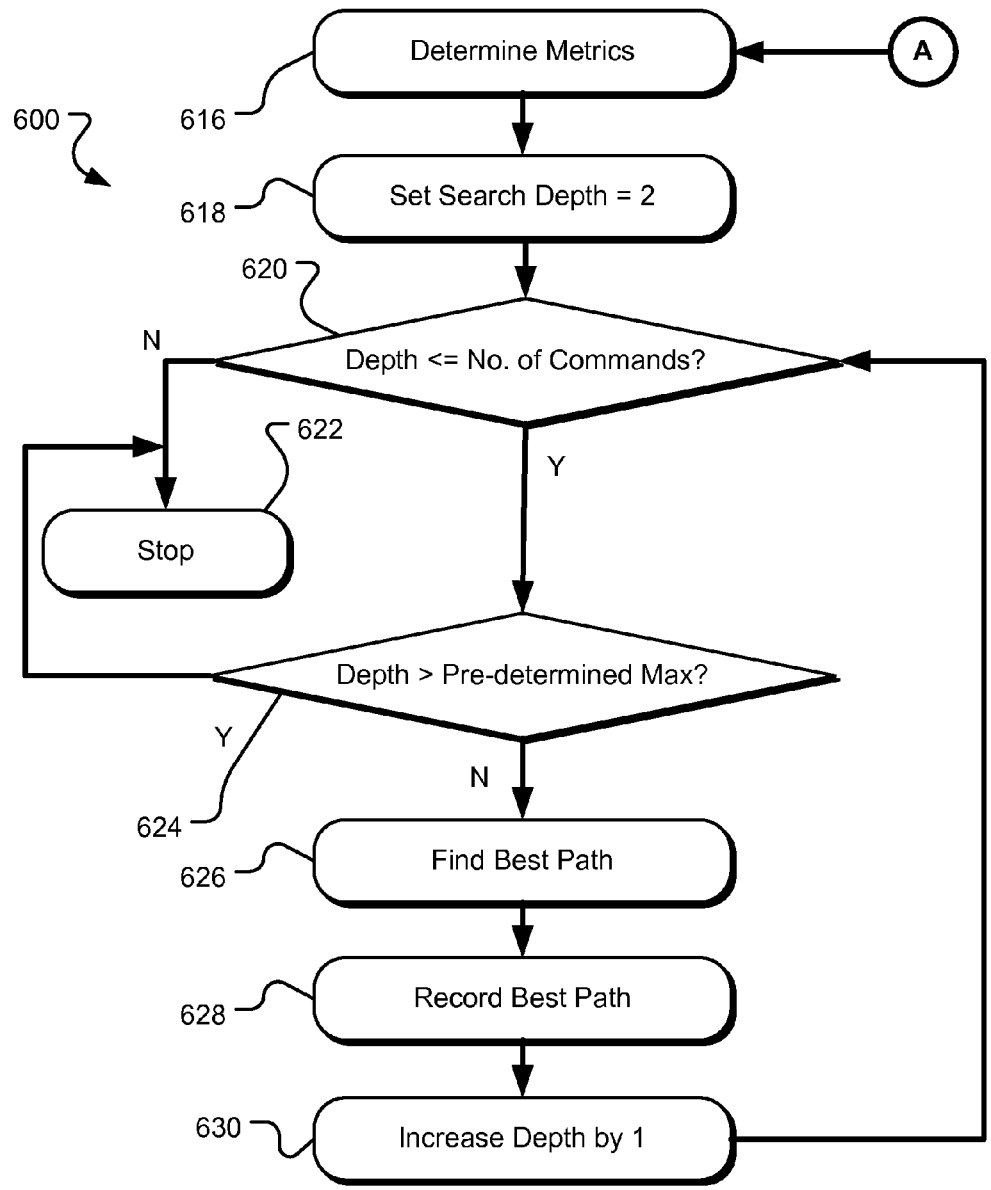

FIGS. 6A and 6B illustrate a flowchart 600 of a method of reordering commands according to one embodiment illustrated herein. Specifically, the flowchart 600 determines the order of the commands based on a search of deeper than depth one. At a block 602, the disk controller 246 is shown to have an idle time entry. In other words, at block 602, the disk controller is shown to have microprocessor/CPU time available to perform calculations of one or more command ordering/optimization searches. The microprocessor/CPU may have idle time when one or more commands are being executed.

A block 604 determines if there is at least one more command in the queue 240. If there are no more commands in the queue 240, there is no further operation necessary, as shown by a block 606. However, the disk controller 246 continues to monitor the queue 240. If it is determined that there is at least one more command in the queue 240, control is passed to a block 608. Block 608 determines if there is at least one depth one search solution for the next command.

If there is no depth-one search solution available for the next command, a block 610 finds the next best command ordering choice starting from an endpoint of the current disk operation based on the current RPO table such as the Table 2. The blocks 608 and 610 represent a special case representing in effect an IDDFS search invoked with a maximum search depth of one. If the block 608 finds at least one depth one search solution for the next command, a block 612 determines if the RPO table, such as the Table 2, has cells that should be filled out. If the RPO table is not complete, a block 614 calculates the values for the one or more cells in the RPO table that are not filled out. Once the RPO table is completed, block 614 passes the control back to the block 612.

Once the block 612 determines that the RPO table is complete, that is the values of the inter-operation cost estimates are filled out, control is transferred to block 616. Block 616, in effect represents an entry point to an iteratively deepening search entry point. In one embodiment, the control is transferred to the block 616 when the RPO table has necessary entries filled out and a depth one choice for the next command is known. In an alternate embodiment, control is transferred to block 616 based on some other criterion, such as a predetermined time limit from starting of certain operation, command, etc. In such an embodiment, the RPO table is not completely filled and the subsequent operations are performed using the information from the partially filled RPO table.

Block 616 determines the metric for the iteratively deepening search by determining the goal of the iteratively deepening search. For example, block 616 may determine what metric to use for reordering commands. In one example, a metric based on the buffers freed per commands executed may be a parameter used for reordering the commands. In an alternate embodiment, the queue entries eliminated per time, buffers freed per unit of energy expended, buffers freed per unit of noise generated, etc may be used as a parameter used for reordering the commands.

A subsequent block 618 sets the depth search to two (2). Block 618 may set the depth search to two (2) based on the amount of processor time available, amount of other processor resources available, etc. A block 620 determines whether the current depth of the search is less than or equal to the number of commands in the RPO table. If the depth is found to be higher than the number of commands in the RPO table, the iterative depth search stops, and as indicated by block 622, the best course of future action of commands, given the current information, is known.

If block 620 determines that the current depth of the search is less than or equal to the number of commands in the RPO table, a block 624 determines if the current depth exceeds some pre-determined maximum search depth. Such maximum claim search depth may be determined based on some analysis of a number of prior iterative searches. For example, such an analysis may indicate that heuristically, the incremental benefits of performing a search at depth n+1 compared to a depth n search are minimal and therefore, it is not advantageous to perform n+1 depth searches.

If the block 620 determines that the current search depth does not exceed the pre-determined maximum search depth, block 626 performs a depth first search of the desired depth to find a path that maximizes the desired metric (as determined at block 616). Subsequently, block 628 determines that best path based on the calculations up to the desired depth. After incrementing the search depth by 1 at a block 630, the control is transferred to block 620. The results of the iterative searches at various depths are stored in a memory that is easily accessible for update and reading, such as on the registers on a microprocessor, etc. In an implementation, the disk controller 246 may move a pointer to point to the registers or memory where the best path at the current depth search is stored.

Figure 7:
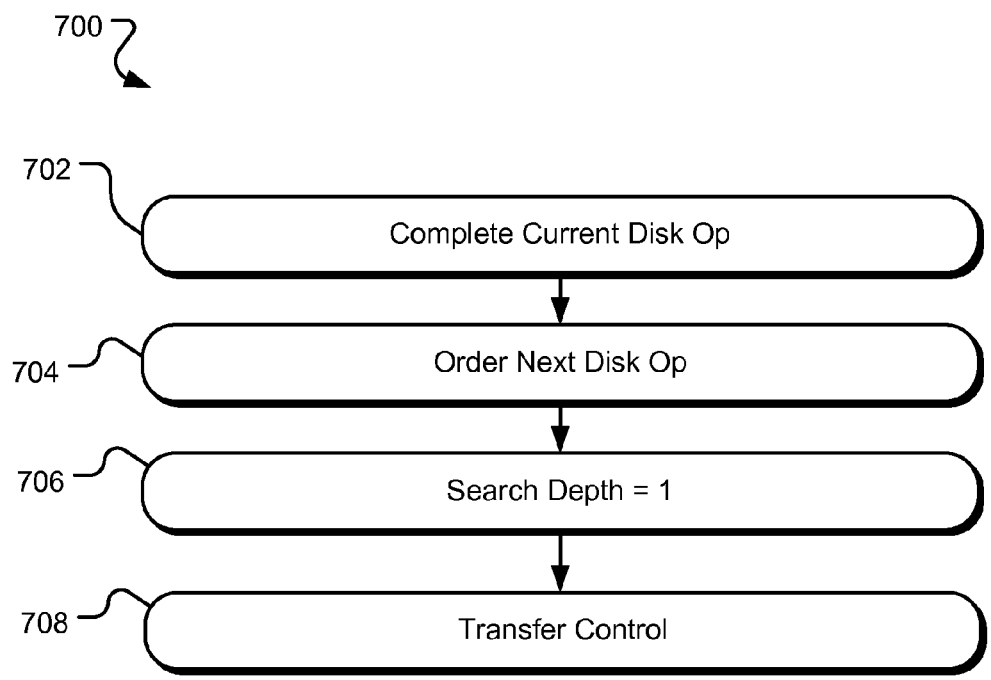
FIG. 7 illustrates a flowchart of a process used by the hard disk drive of FIG. 2 to initiate the iterative depth search of FIG. 6.

FIG. 7 illustrates a flowchart 700 that may activate the steps represented by the flowchart 600 of FIG. 6. At a block 702, the disk controller 246 recognizes that a current disk operation, such as a read or a write command is completed. At block 704, the disk controller 246 orders the next disk operation, such as another command, based on the best path as determined by the iterative depth search of FIG. 6. The disk controller 246 may use, for example, a pointer that points to the current best path to select the next command. At block 706, the disk controller 246 deletes the information from previous searches and sets the search depth to one. Subsequently, a block 708 transfers control to block 602 of the flowchart 600 illustrated in FIG. 6.

While the implementations herein are described with respect to an iteratively deepening search, it should be appreciated that other types of searches may be implemented, depending on desired performance characteristics of the disk drive.

The embodiments described herein are implemented as logical steps in one or more computer systems. The logical operations of the embodiments described herein are implemented (1) as a sequence of processor-implemented steps executing in one or more computer systems and (2) as interconnected machine or circuit modules within one or more computer systems. The implementation is a matter of choice, dependent on the performance requirements of the computer system implementing embodiments described herein. Accordingly, the logical operations making up the embodiments described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments described herein. Since many alternate embodiments can be made without departing from the spirit and scope of the embodiments described herein, the invention resides in the claims hereinafter appended. Furthermore, structural features of the different embodiments may be combined in yet another embodiment without departing from the recited claims. The implementations described above and other implementations are within the scope of the following claims.

What is claimed is:

1. A system comprising:
 a processor comprising:
  a cost table comprising a number of cells, each cell containing one or more cost values related to one of a plurality of parameters wherein each of the plurality of parameters is related to completion of one of a plurality of executable commands;
  a benefit array comprising a number of cells, each cell containing a benefit value related to completion of one of the plurality of executable commands; and
  computer readable instructions encoding a computer program for executing a computer process on the processor, the computer process determining plurality of paths for executing the plurality of executable commands based on the data structure, wherein each of the plurality of paths providing an execution order for at least the next two of the plurality of executable commands, and selecting one of the plurality of paths such that at least one parameter of the storage device is optimized, wherein the at least one parameter of the storage device is at least one cost attached to each of the plurality of paths; and
 an optimization tree, the optimization tree generated based on calculating the one or more cost values and the benefit values related to at least one path of the optimization tree based on one of (1) a fixed depth depth-first search; (2) a breadth-first search; and (3) an iteratively deepening depth first search.

2. The method of claim 1, wherein determining the execution order further comprises:
 determining values of a plurality of cells in a rotational positional ordering (RPO) table.

3. The method of claim 2, wherein selecting one of the plurality of paths further comprises determining a plurality of paths in using a command-ordering optimization tree, wherein each path provides an order for executing at least two or more of the plurality of commands.

4. The method of claim 1, wherein the cost attached to each of the plurality of paths is at least one of (1) time to execute the commands related to the each of the plurality of paths; (2) noise generated in executing the commands related to the each of the plurality of paths; (3) energy consumed in executing the commands related to the each of the plurality of paths; and (4) heat generated in executing the commands related to the each of the plurality of paths.

5. The method of claim 1, wherein the providing an execution order for at least the next two of the plurality of executable commands further comprises preprocessing only a subset of a plurality of paths for executing at least the next two of the plurality of executable commands to determine a cost related to each of the subset of the plurality of paths.

6. A system comprising:
   a data structure comprising:
      a cost table comprising a number of cells, each cell containing one or more cost values related to one of a plurality of parameters wherein each of the plurality of parameters is related to completion of one of a plurality of executable commands;
      a benefit array comprising a number of cells, each cell containing a benefit value related to completion of one of the plurality of executable commands; and
      computer readable instructions encoding a computer program for executing a computer process on a computer system, the computer process determining plurality of paths for executing the plurality of executable commands based on the data structure, wherein each of the plurality of paths providing an execution order for at least the next two of the plurality of executable commands, and selecting one of the plurality of paths such that at least one parameter of the storage device is optimized, wherein the at least one parameter of the storage device is at least one cost attached to each of the plurality of paths; and
   an optimization tree, the optimization tree generated based on calculating the one or more cost values and the benefit values related to at least one path of the optimization tree based on one of (1) a fixed depth depth-first search; (2) a breadth-first search; and (3) an iteratively deepening depth first search.

7. The system of claim 6, wherein each of the plurality of parameters is a traversal representing movement of a head of the storage device.

8. A method of generating a directed graph based on the data structure of claim 6, the method comprising:
   assigning the one or more cost values to edges of the directed graph; and
   assigning the benefit values to nodes of the directed graph.

9. A non-transitory computer-readable storage medium encoding a computer program for executing a computer process on a computer system, the computer process comprising:
   generating a rotational positional ordering (RPO) table for executing a plurality of executable commands via parameter optimization in a plurality of paths in a storage device by (1) determining cost values related to a plurality of parameters on the storage device (2) storing the cost values in a cost table in a computer-readable memory, (3) determining benefit values related to each of the plurality of parameters, and (4) storing the benefit values in a benefit array in the computer-readable storage medium, wherein the cost values and the benefit values are determined when the storage device is performing one or more commands;
   determining a plurality of paths for executing the plurality of executable commands using the RPO table, each of the plurality of paths providing execution order for at least the next two of the plurality of executable commands; and
   selecting one of the plurality of paths such that at least one parameter of the storage device is optimized, wherein the at least one parameter of the storage device is at least one cost attached to each of the plurality of paths.

10. The non-transitory computer-readable storage medium of claim 9, wherein generating the RPO table further comprises preparing a command-ordering optimization tree up to a specific depth based on the RPO table.

11. The non-transitory computer-readable storage medium of claim 10, wherein the specific depth of the command-ordering optimization tree is one of (1) determined dynamically based on an amount of a resource available to a microprocessor; and (2) pre-determined based on heuristic analysis of incremental benefits of performing a search at a depth higher than the specific depth.

12. The non-transitory computer-readable storage medium of claim 11, wherein the available resource is at least one of (1) a microprocessor time; and (2) a microprocessor register space.

13. The system of claim 6, wherein the iteratively deepening depth first search is based on a parameter for reordering commands.

14. The system of claim 13, wherein the parameter is based on buffers freed per commands executed.

15. The system of claim 13, wherein the parameter is based on queue entries eliminated per time.

16. The system of claim 13, wherein the parameter is based on buffers freed per unit of energy expended.

17. The system of claim 13, wherein the parameter is based on buffers freed per unit of noise generated.

18. The system of claim 6, wherein the cost values attached to each of the parameters is at least one of (1) time to execute the commands related to the each of the plurality of paths; (2) noise generated in executing the commands related to the each of the plurality of paths; (3) energy consumed in executing the commands related to the each of the plurality of paths; and (4) heat generated in executing the commands related to the each of the plurality of paths.

19. The non-transitory computer-readable storage medium of claim 9, wherein the cost values attached to each of the parameters is at least one of (1) time to execute the commands related to the each of the plurality of paths; (2) noise generated in executing the commands related to the each of the plurality of paths; (3) energy consumed in executing the commands related to the each of the plurality of paths; and (4) heat generated in executing the commands related to the each of the plurality of paths.

20. The non-transitory computer-readable storage medium of claim 9, wherein the providing an execution order for at least the next two of the plurality of executable commands further comprises preprocessing only a subset of a plurality of paths for executing at least the next two of the plurality of executable commands to determine a cost related to each of the subset of the plurality of paths.

* * * * *